United States Patent [19]

MacDougall et al.

[11] Patent Number: 5,717,563
[45] Date of Patent: Feb. 10, 1998

[54] ELECTRODE PATTERNING IN METALLIZED ELECTRODE CAPACITORS

[75] Inventors: Frederick W. MacDougall; Xiao Hui Yang, both of Marion; Ronald B. Rice, New Bedford, all of Mass.

[73] Assignee: Aerovox Incorporated, New Bedford, Mass.

[21] Appl. No.: 669,865

[22] Filed: Jun. 10, 1996

[51] Int. Cl.[6] .................................................. H01G 4/005
[52] U.S. Cl. .................. 361/303; 361/301.5; 361/306.3; 361/313; 361/309; 361/321.1
[58] Field of Search ............................ 361/301.1, 301.5, 361/303, 306.3, 309, 311, 313, 321.1, 321.2, 321.4, 321.5, 321.6, 301.4, 312; 29/25.42

[56] References Cited

U.S. PATENT DOCUMENTS

| | | | |
|---|---|---|---|
| 3,148,315 | 9/1964 | Rondeau et al. | 317/258 |
| 3,721,870 | 3/1973 | Edge | 317/258 |
| 4,121,274 | 10/1978 | Simson et al. | 361/273 |
| 4,142,222 | 2/1979 | Kotschy et al. | 361/273 |
| 4,190,878 | 2/1980 | Förster | 361/305 |
| 4,305,111 | 12/1981 | Förster | 361/273 |
| 4,364,099 | 12/1982 | Koyama et al. | 361/305 |
| 4,379,182 | 4/1983 | Behn et al. | 427/41 |
| 4,477,858 | 10/1984 | Steiner | 361/273 |
| 4,509,234 | 4/1985 | Voglaire | 29/25.42 |
| 4,635,163 | 1/1987 | Voglaire | 361/275 |
| 4,868,711 | 9/1989 | Hirama et al. | 361/321 |
| 4,875,136 | 10/1989 | Sano et al. | 361/321 |
| 4,959,745 | 9/1990 | Suguro | 361/311 |
| 5,012,565 | 5/1991 | Gillet | 29/25.42 |
| 5,136,462 | 8/1992 | Steiner | 361/273 |
| 5,414,588 | 5/1995 | Barbee, Jr. et al. | 361/304 |
| 5,442,517 | 8/1995 | Yen et al. | 361/305 |
| 5,615,078 | 3/1997 | Hudis et al. | 361/313 |

*Primary Examiner*—Leo P. Picard
*Assistant Examiner*—Anthony Dinkins
*Attorney, Agent, or Firm*—Fish & Richardson P.C.

[57] ABSTRACT

A metallized capacitor has two layers of electrically insulating film wound as a roll, two metal electrodes vacuum deposited on respective ones of the two layers of film, and two end-sprays of electrically conductive material deposited on respective ends of the roll, each of the end-sprays being in electrical contact with one of the two vacuum-deposited metal electrodes. Each of the metal electrodes has a segmented metallization pattern having segments of relatively thick electrode material separated by periodic segments of relatively thin electrode material so as to define a repeating pattern of relatively thick and relatively thin segments along the length of the layer of electrically insulating film on which the metal electrode is deposited. Each of the metal electrodes may have a thickness, at at least certain locations along the length of the film on which the electrode is deposited, that decreases from the end-spray with which the metal electrode is in contact to an edge of the film that is opposite to the end-spray, the thickness having a profile from the end-spray to the edge opposite the end-spray that provides approximately constant wattage from a point in the vicinity of the end-spray to a point in the vicinity of the edge opposite the end-spray during use of the capacitor.

12 Claims, 13 Drawing Sheets

ELECTRODE PATTERNING IN METALLIZED ELECTRODE CAPACITORS

BACKGROUND OF THE INVENTION

This application relates to electrode patterns applied to layers of electrically insulating film in metallized electrode capacitors and more particularly relates to segmented metallization patterns for directing energy away from faults in the capacitor as well as electrode profiles across the width of the film configured to provide approximately constant wattage across the width of the film during use of the capacitor.

During the life of a metallized electrode capacitor faults may occur in which two electrodes are short-circuited through a hole in an electrically insulating film on which one of the electrodes is deposited. When a fault occurs electrical current tends to be concentrated into the fault, and the energy dumped into the fault tends to vaporize or oxidize the electrodes, thereby "clearing" them away.

It is important that the fault clearing action does not cause additional faults to occur, which is referred to as the fault becoming progressive. Also, it is important that the rate at which the electrodes are vaporized or oxidized due to the clearing action must be acceptably low so that the capacitor does not undergo an undue loss of capacitance. In order to avoid such potential problems, various segmented metallization patterns can be applied to the electrically insulating film of metallized electrode capacitors. Such patterns typically include periodic non-metallized segments extending across at least a substantial portion of the film. These patterns are provided in an effort to limit the amount of energy that can be delivered to a fault and to disconnect areas that have had a fault from the rest of the capacitor. The period non-metallized segments act as barriers to current that would otherwise tend to flow into a fault.

SUMMARY OF THE INVENTION

One aspect of the invention features a metallized capacitor having two layers of electrically insulating film wound as a roll, two metal electrodes vacuum deposited on respective ones of the two layers of film, and two end-sprays of electrically conductive material deposited on respective ends of the roll, each of the end-sprays being in electrical contact with one of the two vacuum-deposited metal electrodes. Each of the metal electrodes has a segmented metallization pattern having segments of relatively thick electrode material separated by periodic segments of relatively thin electrode material so as to define a repeating pattern of relatively thick and relatively thin segments along the length of the layer of electrically insulating film on which the metal electrode is deposited.

By separating the segments of relatively thick electrode by periodic segments of relatively thin electrode material the invention makes it possible to avoid edges between metallized and non-metallized areas. Thus, the total perimeter of the metal electrodes in the active area of the dielectric film can be reduced. Because such edges can be avoided at the interfaces of the segments of relatively thick electrode material and the segments of relatively thin electrode material, it is believed the invention can reduce any tendency of these interfaces to be associated with high electrical fields or to serve as sites for the initiation of partial discharge activity (corona) that causes electrode erosion at such sites and thus leads to loss of capacitance. Moreover the invention can provide high capacitance in a capacitor of a given size because periodic non-metallized segments that do not contribute to capacitance can be avoided.

Another aspect of the invention features a capacitor in which each of the metal electrodes has a thickness, at at least certain locations along the length of the film on which the electrode is deposited, that decreases from the end-spray with which the metal electrode is in contact to an edge of the film that is opposite to the end-spray, the thickness having a profile from the end-spray to the edge opposite the end-spray that provides approximately constant wattage from a point in the vicinity of the end-spray to a point in the vicinity of the edge opposite the end-spray during use of the capacitor.

For example, if the electrical current present at specific locations along the width of each electrode decreases at a constant rate from the end spray to the edge of the film opposite to the end-spray, then in order to make the wattage (which is equal to $I^2R$) constant the profile of the thickness (which is inversely proportional to R) of each of the metal electrodes should vary approximately as the square of the distance from a point in the vicinity of the edge opposite the end-spray to a point in the vicinity of the end-spray.

By providing approximately constant wattage across the width of the film the invention provides good control of the temperature of the capacitor, which should be roughly proportional to wattage consumption at any given location. It is believed that an approximately constant temperature across the width of the film minimizes failures due to high energy in hot locations.

Numerous other features, objects, and advantages of the invention will become apparent from the following detailed description when read in connection with the accompanying drawings.

BRIEF DESCRIPTION OF THE DRAWINGS

FIG. 24 is an exploded view of Area A in FIG. 22.

DETAILED DESCRIPTION

Figure 1:
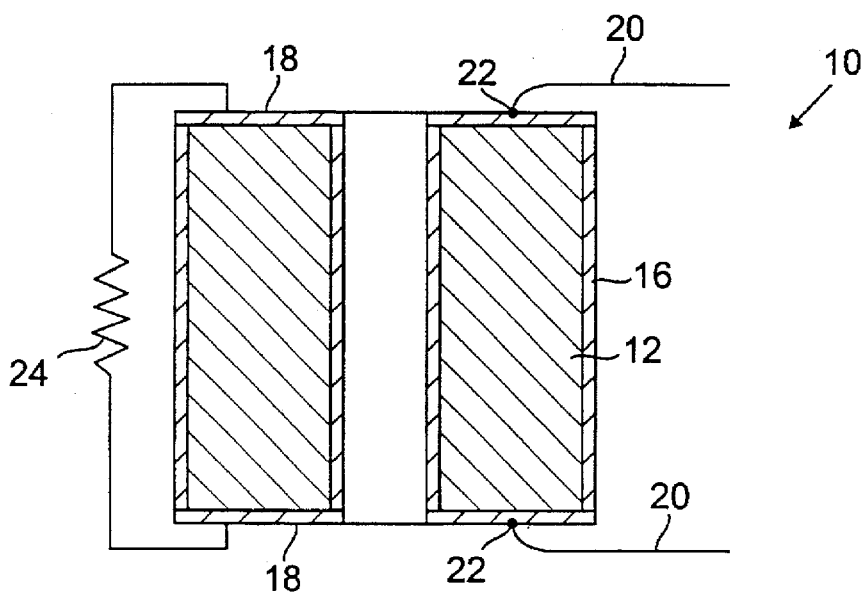
FIG. 1 is a cross sectional drawing of a metallized electrode capacitor in accordance with the invention.

With reference to FIG. 1, metallized electrode capacitor 10 in accordance with the invention includes a pair of electrically insulating films on which metallized electrodes have been vacuum deposited, the films being tightly wound in a roll 12 around core 14. The films may consist of, for example, polypropylene, polyester, or polyethylene teraphthalate (PET), and the metallized electrodes, which are vacuum deposited on the films in accordance with the patterns described below, may consist of, for example, pure zinc, pure aluminum, or a combination of zinc and aluminum. The metallized electrodes made include a thin surface of a nucleating agent such as silver, platinum, or copper. The electrodes are deposited on one side of each film, such that the electrically insulating material of the film separates the two electrodes from each other. One film has an electrode-free margin area at the top of the capacitor while the other film has an electrode-free margin area at the bottom of the capacitor. Also, the two films are staggered slightly with respect to each other during the rolling process such that the electrode-free margin area of each film is located a slight distance away from the top or bottom of the roll of films.

After the films have been wound into roll 12, a wrap 16 of plain polypropylene is heat sealed around roll 12 so that the capacitor will not unwind. Two end-sprays 18 of electrically conductive material are then applied to the top and bottom ends of the capacitor. Each end-spray is in electrical contact with the vacuum-deposited electrode material on only one of the two films. When the end-sprays are applied to the capacitor, some of the spray goes down the outer sides of the capacitor and down the middle of core 14. This is eliminated by drilling out the ends of the core and brushing off the outside of the capacitor. Alternatively, instead of drilling out the ends of the core, a technique called "plugging" can be employed in which a small ball is driven into each end of the core, before the end-spray is applied to the capacitor, to prevent the end-spray from getting into the core. Another alternative is to flatten the capacitor into an oval, before the end-spray is applied, such that the core is collapsed and no end-spray material can get into the core. Instead of brushing off the outside of the capacitor, the capacitor can be wrapped in tape, before the end-spray is applied, such that only the ends of the capacitor are exposed. After the capacitor is sprayed the tape is then removed.

After the capacitor has been drilled and brushed, it is stamped and tested. Following this, lead wires 20 are soldered to end-sprays 18 at solder connections 22 and a resistor 24, if needed, is added. A wax coating (not shown) is then applied around the entire capacitor as a layer of protection between the capacitor and the outside world.

The capacitor shown in FIG. 1 is typical of capacitors that can be used in such applications as magnetic, as opposed to electronic, fluorescent light ballasts. A customer who receives the capacitor typically attaches it to the guts of the ballast, puts the capacitor in a ballast can, and pours hot pitch over the assembly. The wax coating absorbs much of the heat from the pitch. The pitch serves as an additional layer of protection for the capacitor.

In other embodiments, instead of coating the capacitor with wax, the capacitor is wrapped in tape and then a plastic end fill is used to seal the ends of the capacitor. The capacitor may also be placed in a plastic or metal can, the ends of the which are then filled with plastic. Core 14 may in some embodiments be eliminated.

With reference to FIGS. 2–18 there are shown various patterns of electrode material in accordance with the invention that can be applied to the electrically insulating films. There is always a margin area 26 at one edge of the film that prevents one of the end-sprays from contacting the electrode material. The electrode material at the other edge of the film is intended to be electrical contact with the other end-spray. Each of the films shown in FIGS. 2–18 is designed to be matched with a second sheet of electrically insulating film having a second metal electrode vacuum deposited thereon, which second metal electrode may or may not be segmented as shown in FIGS. 2–18. The electrode-free margin area of the second film would be at the top of each of the figures and the edge of the second electrode intended for contact with one of the end-sprays would be at the bottom of each of the figures.

Figure 2:
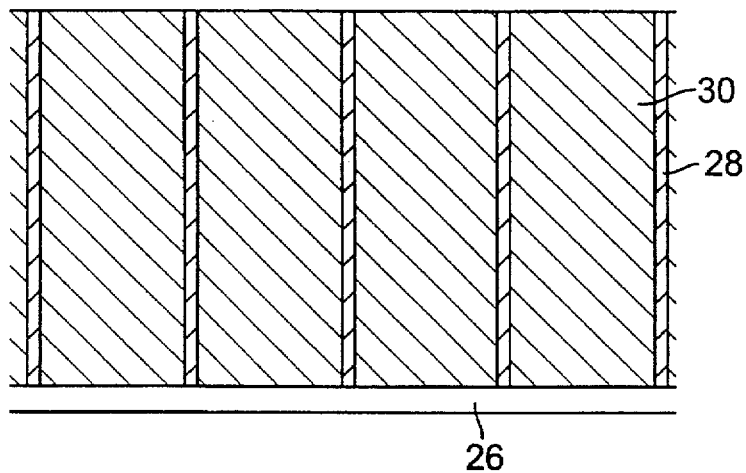
FIGS. 2–18 are drawings of films for use in capacitors of the type shown in FIG. 1, the films having vacuum-deposited metal electrodes patterned in accordance with the invention.

FIG. 2 shows one particular example of a metallization pattern in which area 28 of the film is coated with electrode material that is much thinner than area 30, rather than area 28 being without any metallization at all like margin area 26. The resistivity across area 28 will be high in comparison to area 30. During normal operation of the capacitor, the current associated with area 28 will flow into the adjacent electrode material of area 30 and then to the edge of the film, and the effect of area 28 is minimal. During fault conditions, however, the fault will cause the impedance of one of panels 30 to become very low. At this time, the high impedance of adjacent areas 28 will result in most of the energy directed at the fault flowing around areas 28. This constriction of current will result in a higher impedance through the fault and a resultant lower energy dump. Also, if the fault is sufficiently large, the thin metal in areas 28 around the panel 30 will be cleared away. This will further concentrate the fault current at the end-sprayed edge. If the current at the end-sprayed edge is sufficiently high, then the entire panel 30 will disconnect.

The presence of metallization in area 28 increases overall capacitance while at the same time avoiding "edge effects" associated with interfaces between metallized and non-metallized areas, i.e., the tendency of these interfaces to be associated with high electrical fields or to serve as sites for the initiation of partial discharge activity that causes electrode erosion at such sites.

Figure 3:
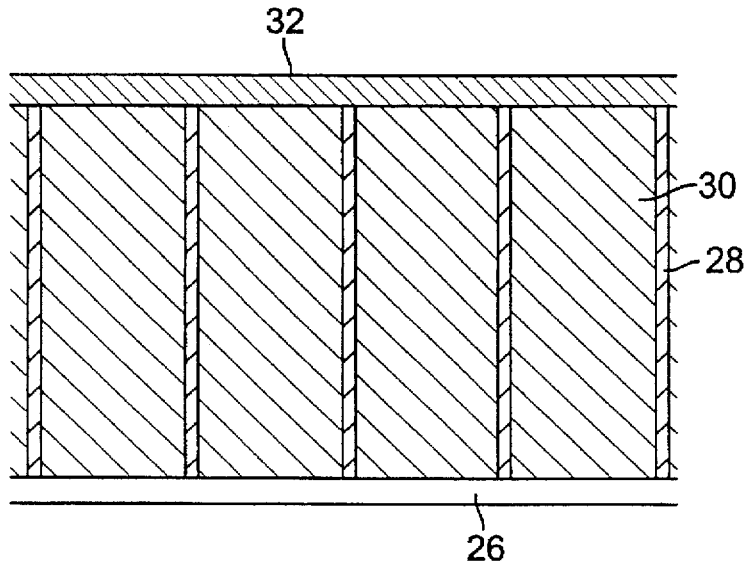
Figure 4:
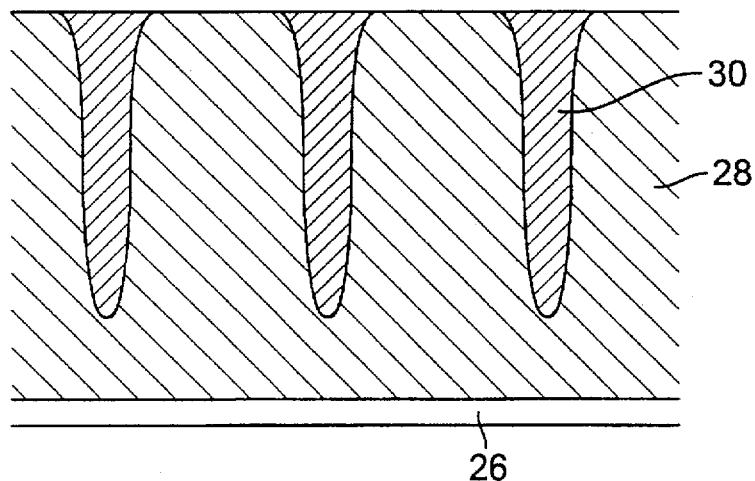
Figure 5:
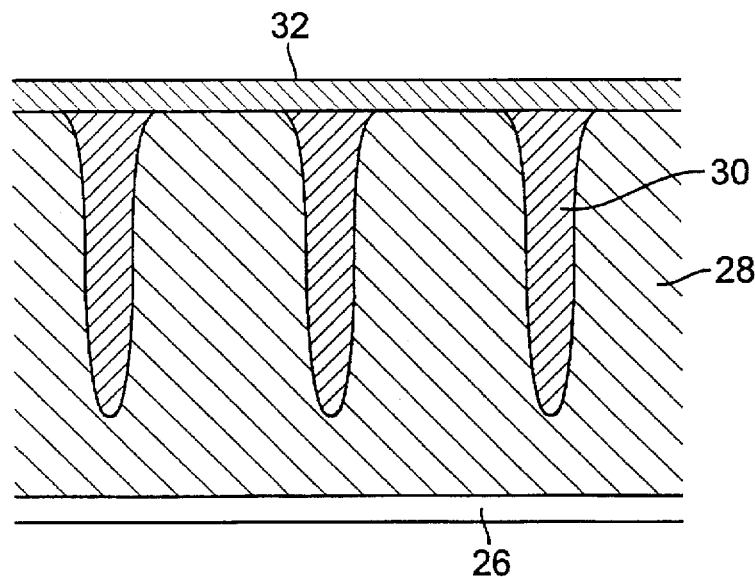
Figure 6:
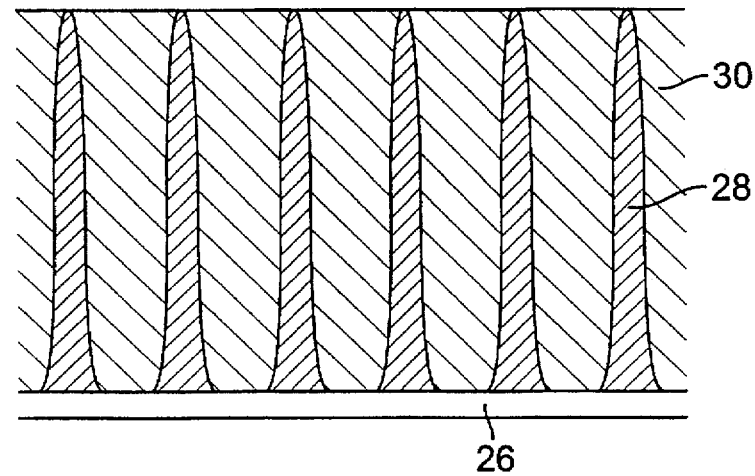
Figure 7:
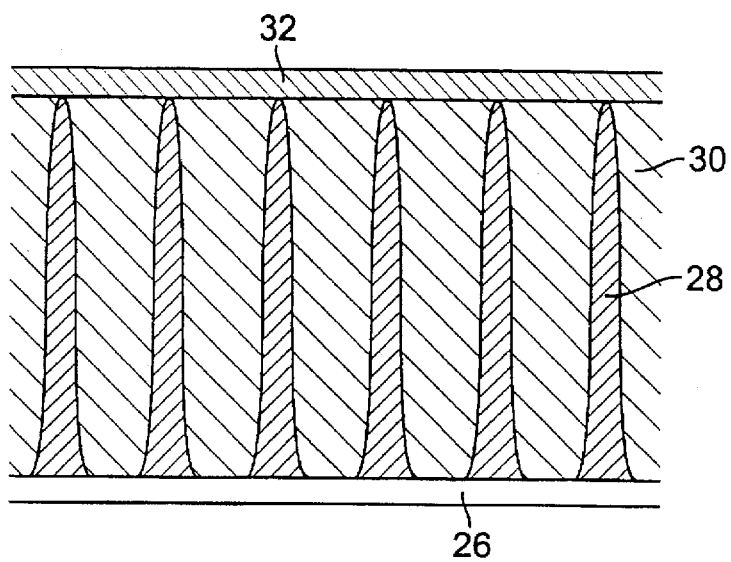
Figure 8:
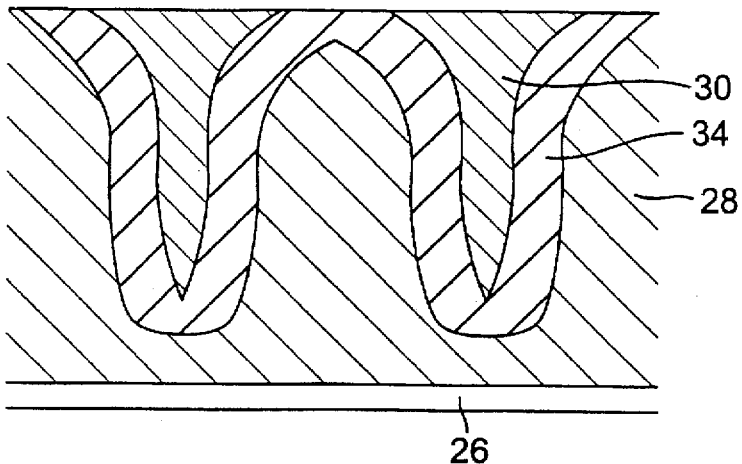
Figure 9:
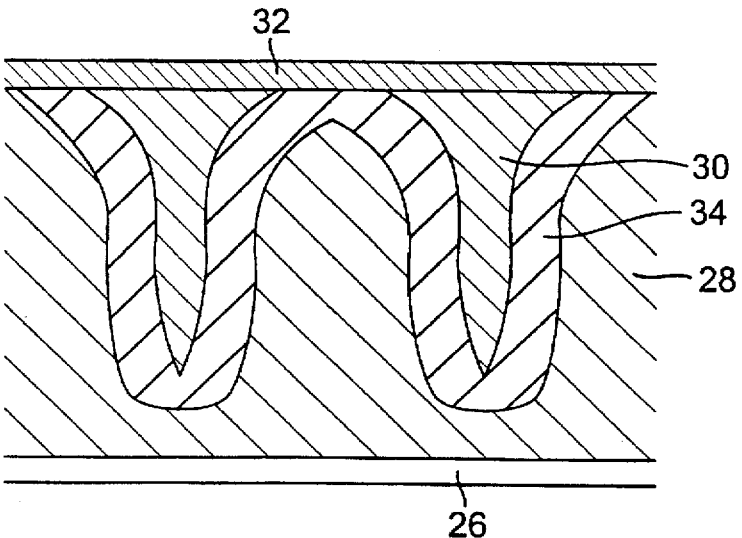
Figure 10:
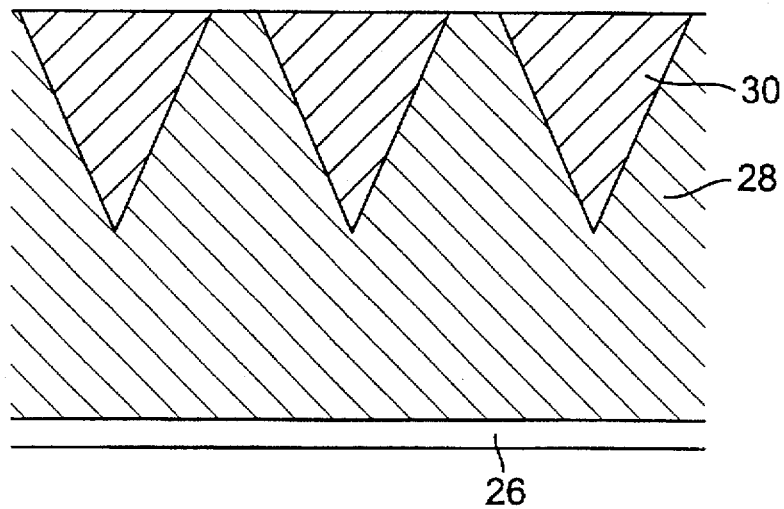
Figure 11:
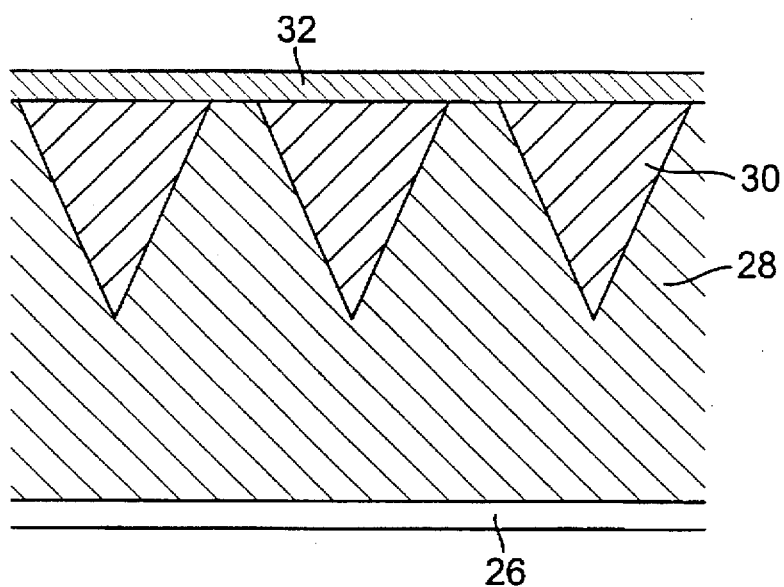

There are many variations in electrode patterns that can be made where the energy will be directed in a manner that increases impedance through a fault. FIG. 3 is similar to FIG. 2 except that it uses a heavy, continuous edge of metal 32 having a thickness equal to or greater than that of the rest of the metal electrode material.

The current density of the electrode material under normal conditions is not constant. The current at the end-sprayed end will be maximum while the current adjacent margin area 26 will be zero. Because of this, the electrode can be shaped such that there is more electrode material where the current is higher. Thinner electrodes have less of a current-capability under both normal and fault conditions than thicker electrodes. By making the electrode thinner in low-current areas, the clearing action in such areas can be assisted with little effect on the normal operation of the capacitor. FIGS. 4–18 show this feature in a variety of patterns.

Figure 12:
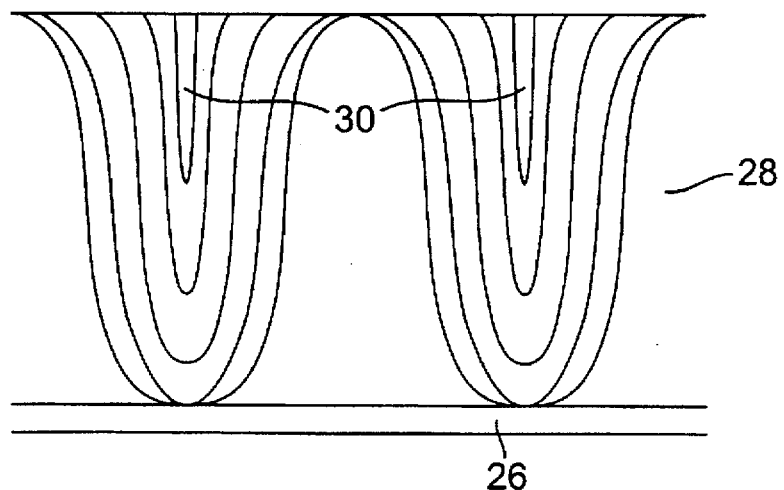
Figure 13:
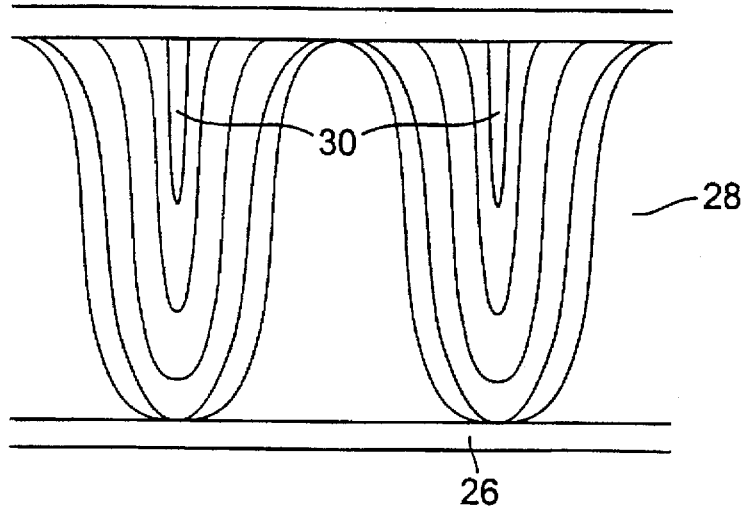

While some of the figures show only a few different discrete electrode thicknesses (thin areas 28, thick areas 30, and intermediate areas 34, the electrode can instead have a gradient such as is shown in FIGS. 12 and 13. The discrete or gradient-like nature of transitions between thick and thin areas depends on the particular process used in metallization. Some examples of metallization processes are described further below.

Figure 14:
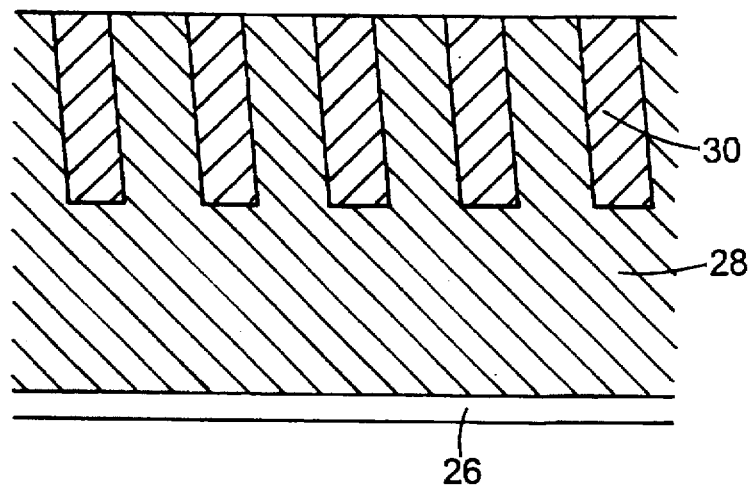
Figure 15:
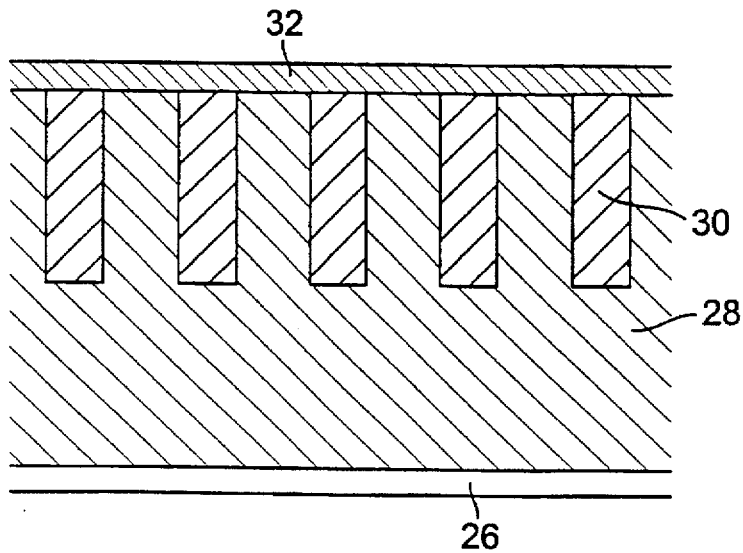
Figure 16:
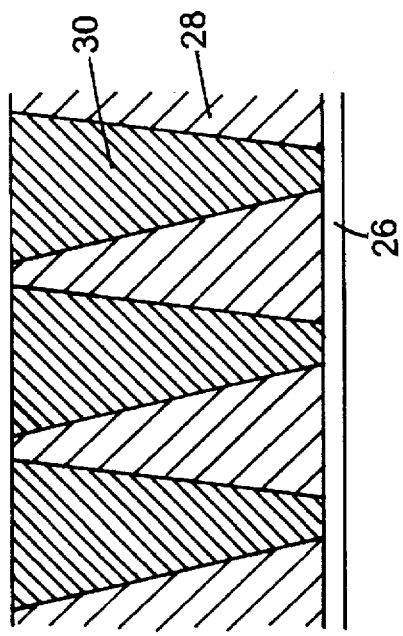
Figure 17:
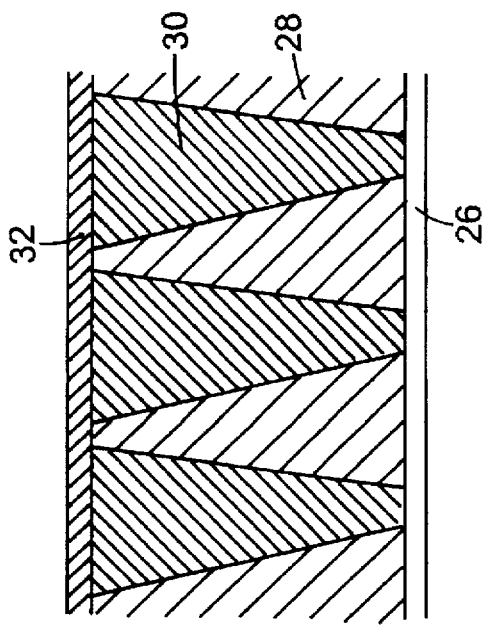

The metallization operation can often be more easily achieved if the pattern is not straight but at an angle, for reasons described further below. This is shown in FIGS. 14, 16, and 17 where the thinner and thicker areas 28 and 30 are tilted.

Figure 18:
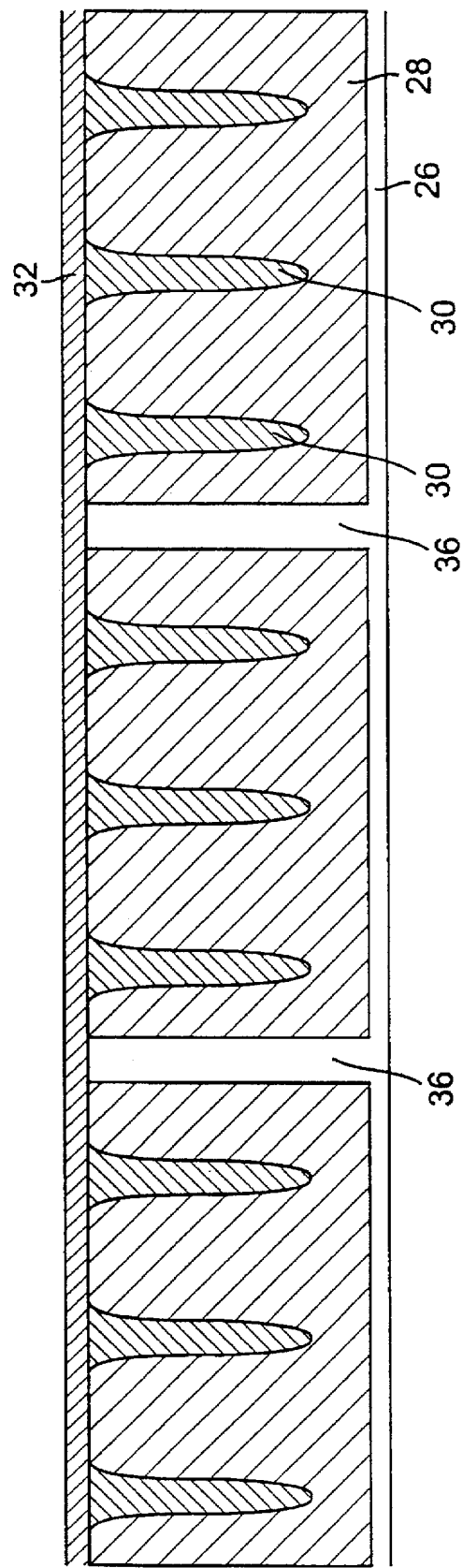

It is also possible according to the invention to combine energy-directing thin areas 28 of electrode material with periodic gaps 36 of completely non-metallized film as shown in FIG. 18. Gaps 36 assist in limiting the amount of energy that can be delivered to a fault and disconnecting areas that have had a fault from the rest of the capacitor. The presence of gaps 36 reduces overall capacitance, however, and can lead to the "edge effects" described above.

Figure 19:
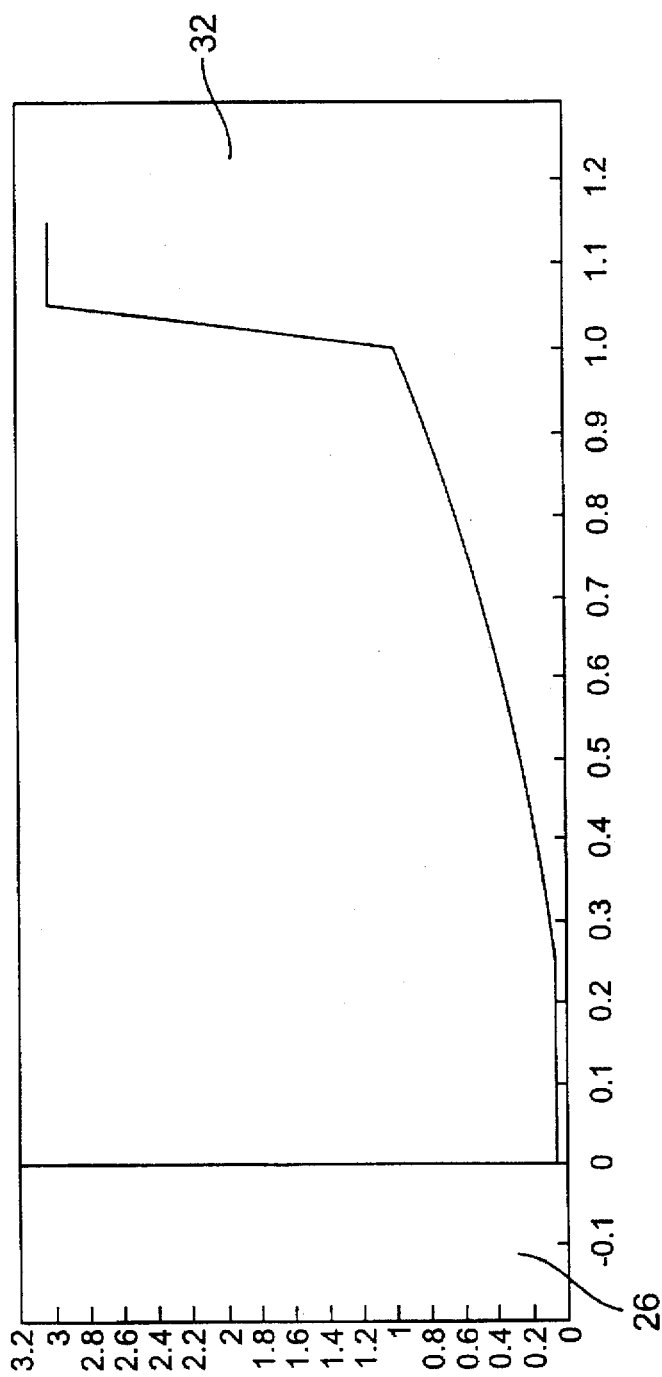
FIG. 19 is a diagram of the profile of electrode thickness across the width of a film according to one embodiment of the invention.
Figure 20:
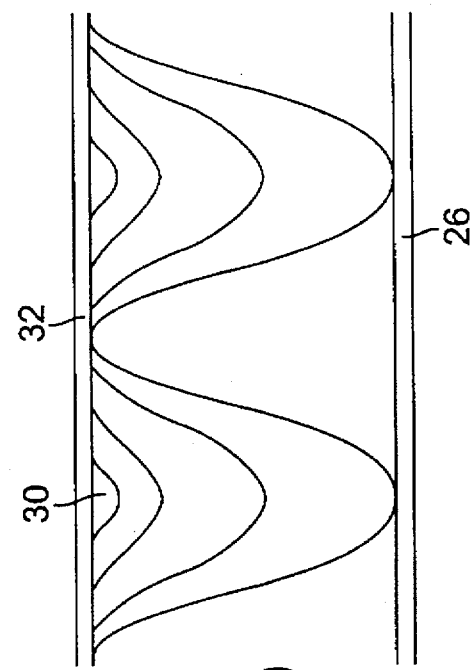
FIG. 20 is a drawing of a film for use in capacitors of the type shown in FIG. 1, the film having vacuum-deposited metal electrodes patterned in accordance with the invention and having a profile of the type shown in FIG. 19.

With reference to FIG. 19, in one embodiment according to the invention a metallized electrode has a gradient across the width of the film, at at least certain locations on the film, that increases from the margin area 26 to the heavy, continuous metallized edge 32 approximately as the square of the distance from margin area 26 (represented by "0" on the X-axis in FIG. 19) to heavy edge 32 (represented by "1" on the X-axis in FIG. 19). The electrical current present in the electrode decreases at a constant rate from metallized edge 32 to margin area 26. Thus, in order to make the wattage (which is equal to $I^2R$) constant the profile of the electrode thickness (which is inversely proportional to R) varies approximately as the square of the distance from metallized edge 32 to margin area 26. The approximately constant wattage across the width of the film provides good control of the temperature of the capacitor and thereby minimizes failures due to high energy in hot locations. Of course, the electrode thickness need not vary exactly as the square of distance to provide substantially the same advantages as an ideal profile. For example, in the region adjacent margin area 26 in FIG. 19 the electrode thickness is level, due to the limits of vacuum-deposition techniques. FIG. 20 shows an electrode pattern combining a periodic energy-directing metallization pattern in the longitudinal direction with the constant-wattage profile in the transverse direction.

Figure 21:
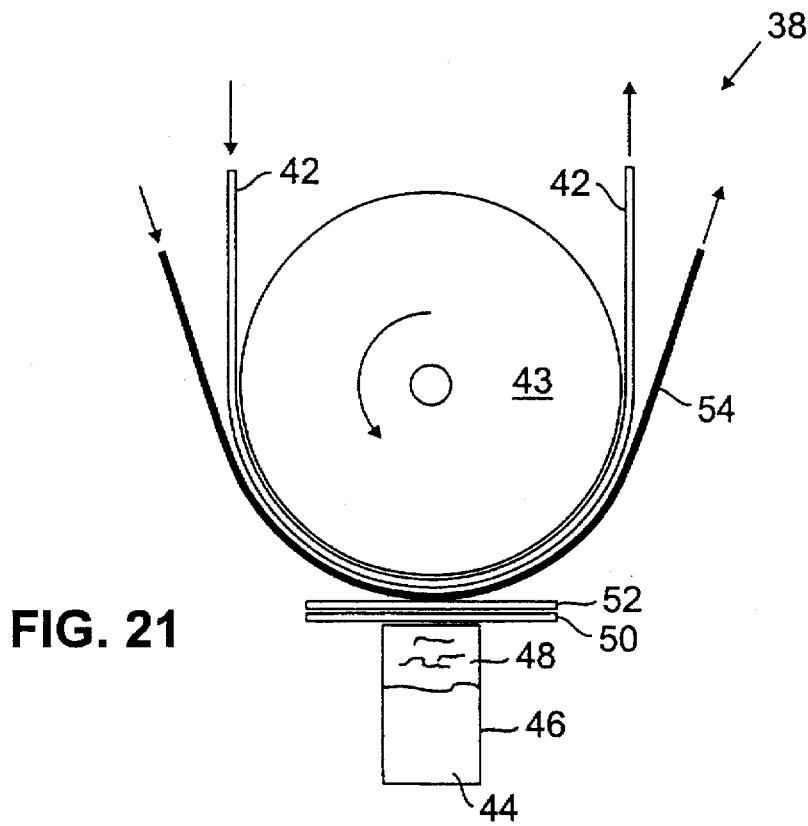
FIG. 21 is a drawing of an apparatus for vacuum-depositing electrodes on films in accordance with the invention.
Figure 22:
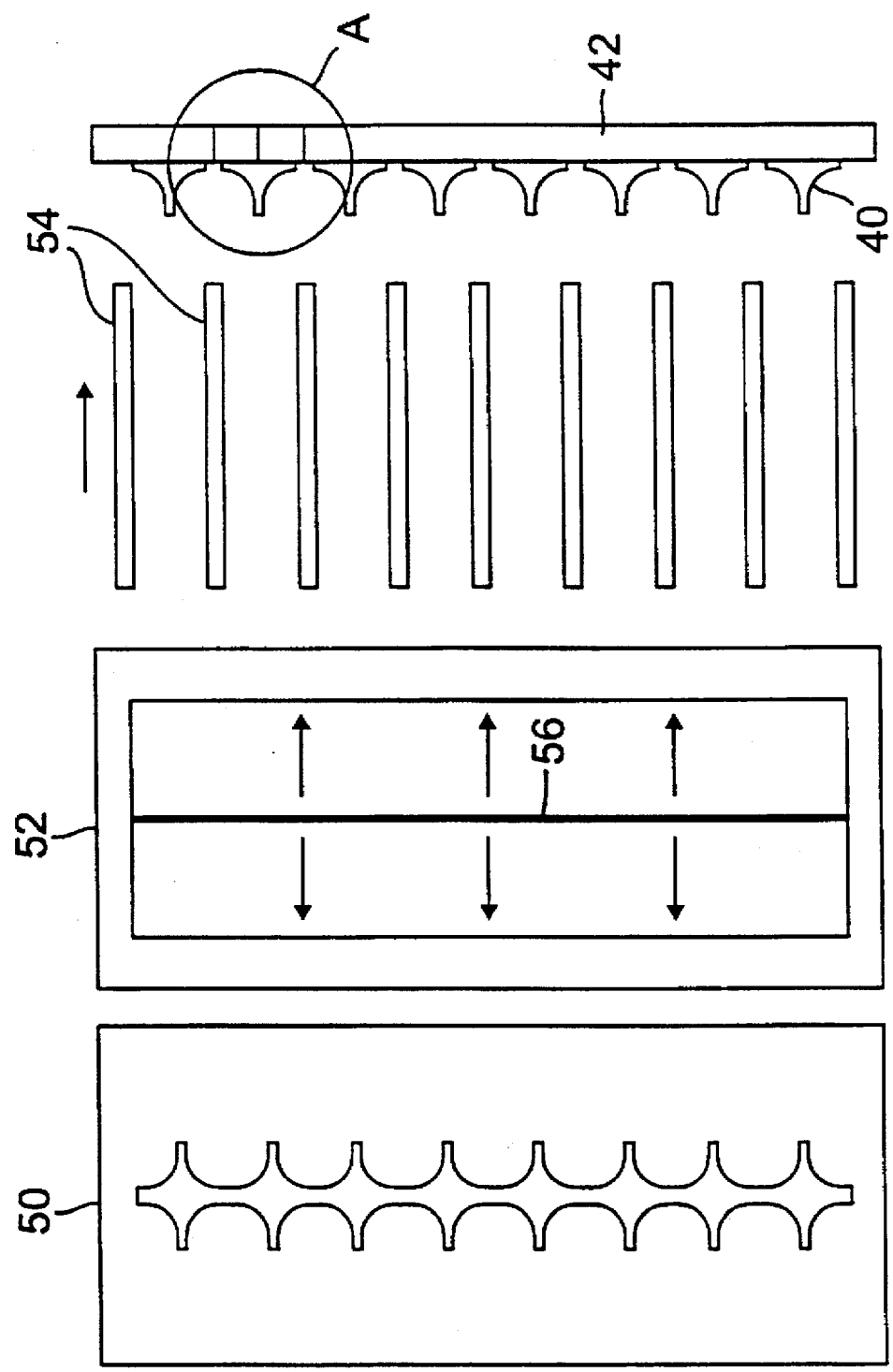
FIG. 22 is a drawing showing the configurations of the stationary mask, moving mask, moving bands, and metallized film shown in FIG. 21.
Figure 24:
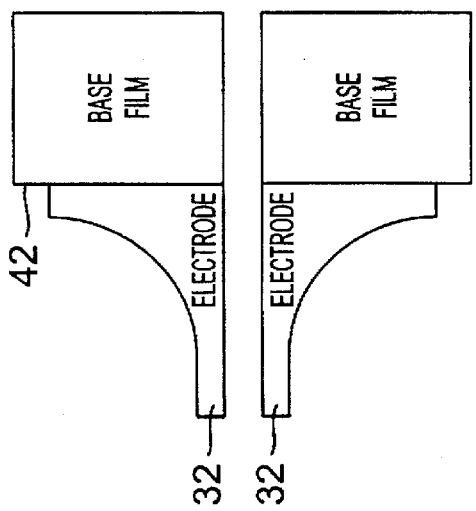
FIG. 24 is a cross-sectional drawing of the pair of metallized films of FIG. 23, the electrode thickness being exaggerated for clarity.
Figure 23:
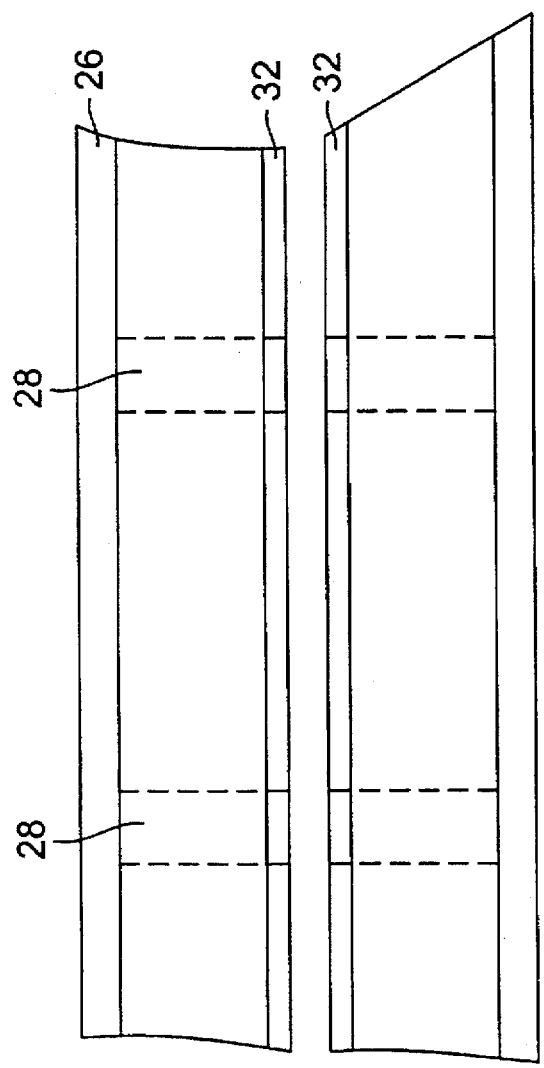
FIG. 23 is a drawing of a pair of metallized films formed by the apparatus of FIG. 21.

With reference to FIGS. 21 and 22, one example is shown of an apparatus 38 for vacuum-depositing electrode material 40 on film 42 in accordance with the invention, the electrode and film produced by the vacuum deposition process being shown in detail in FIGS. 23 and 24. Molten metal 44 in boat 46 is heated to produce metal vapor 48, which passes through stationary mask 50 and moving mask 52 and is deposited on a wide strip of film 42, which passes under rotating cooling drum 43. The wide strip of film 42 will later be slit longitudinally to produce a number of strips suitable for use in capacitors. A set of moving bands 54 pass directly underneath film 42 to prevent the metal vapor from being deposited on a number of margin areas 26 on the film. Stationary mask 50 is configured to produce a set of thickness profiles in the transverse direction (the "machine direction") similar to the profile shown in FIG. 19. Moving mask 52, having strip 56 extending in the transverse direction, moves back and forth in the direction shown by the arrows in FIG. 22 in order to create a periodic gradient in thickness in the longitudinal ("cross machine") direction of film 42. Because the film 42 is moving while mask 52 moves, this process will result in tilted variations in thickness as described above in connection with FIGS. 14, 16, and 17. After the electrode material has been deposited, film 42 is slit longitudinally down the centers of margin areas 26 and heavy edges 32.

Figure 25:
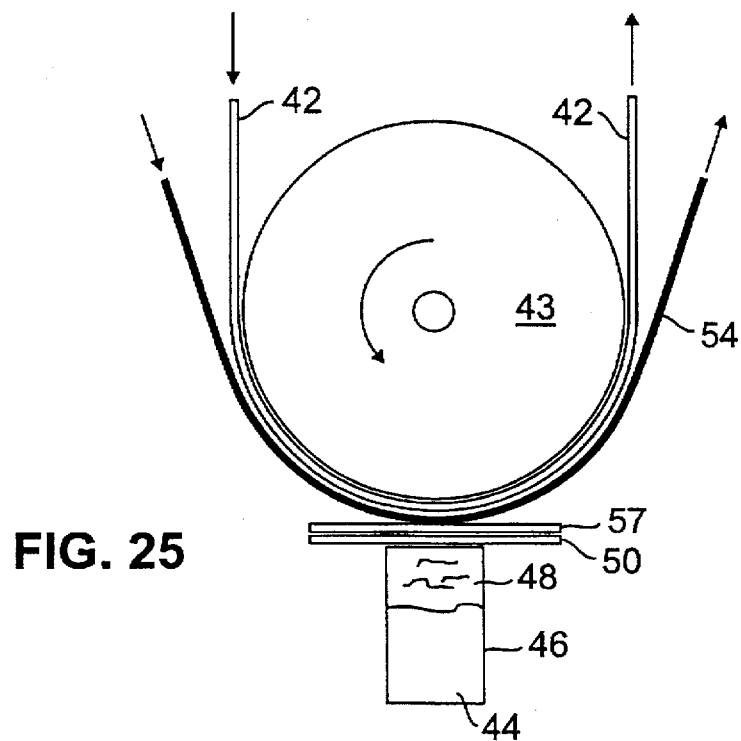
FIGS. 25 and 26 are drawings of another apparatus for vacuum-depositing electrodes on films in accordance with the invention.
Figure 26:
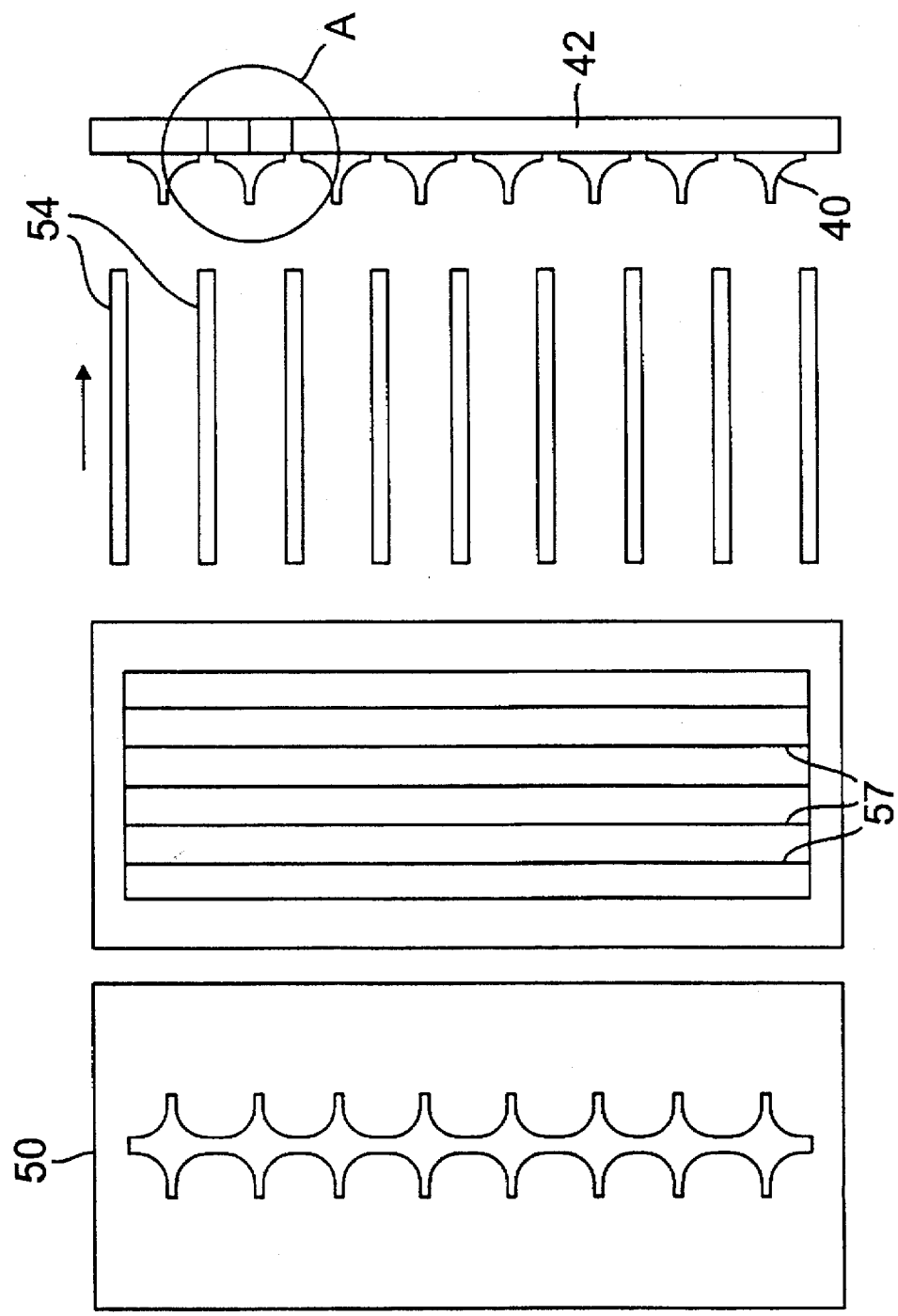

Alternatively, as shown in FIGS. 25 and 26, electrically charged wires 57 can be substituted for moving mask 52 to cause the periodic thick and thin stripes of metallization in the longitudinal direction. Instead of moving mask 52 to displace metal vapor 48, the electrical potential on wires 57 is changed, thereby resulting in changes in the rate at which metal vapor 48 reaches film 42 due to ionization effects.

Figure 27:
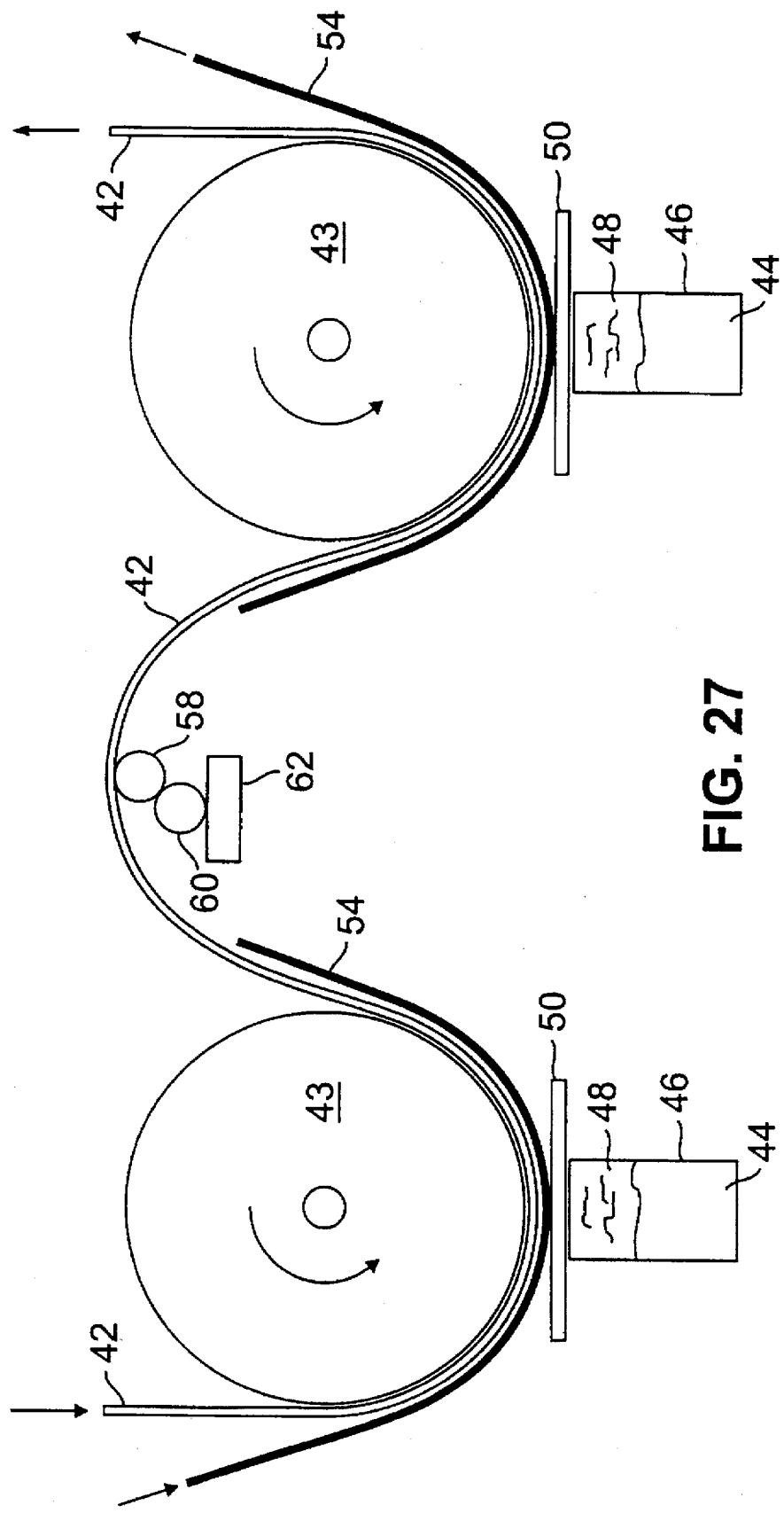
FIG. 27 is a drawing of yet another apparatus for vacuum-depositing electrodes on films in accordance with the invention.

With reference to FIG. 27, another apparatus is shown for producing electrode patterns having relatively discrete transitions between thick and thin electrode areas rather than gradients of the type that can be produced by means of the apparatuses discussed above. Roller 58 is provided for applying a pattern of oil to film 42, roller 58 being made of a soft material having a raised pattern corresponding to the pattern to be applied to film 42. Transfer roller 60 transfers oil from oil tank 62 to roller 58. In the process of applying metal to film 42, the film is first metallized, by means of apparatus 64, with a thin layer of electrode material. Then, the pattern of oil is applied to the film and another layer of electrode material is applied to the film by means of apparatus 66. The oil resists the deposition of additional electrode material in the areas to which the oil has been applied.

Figure 28:
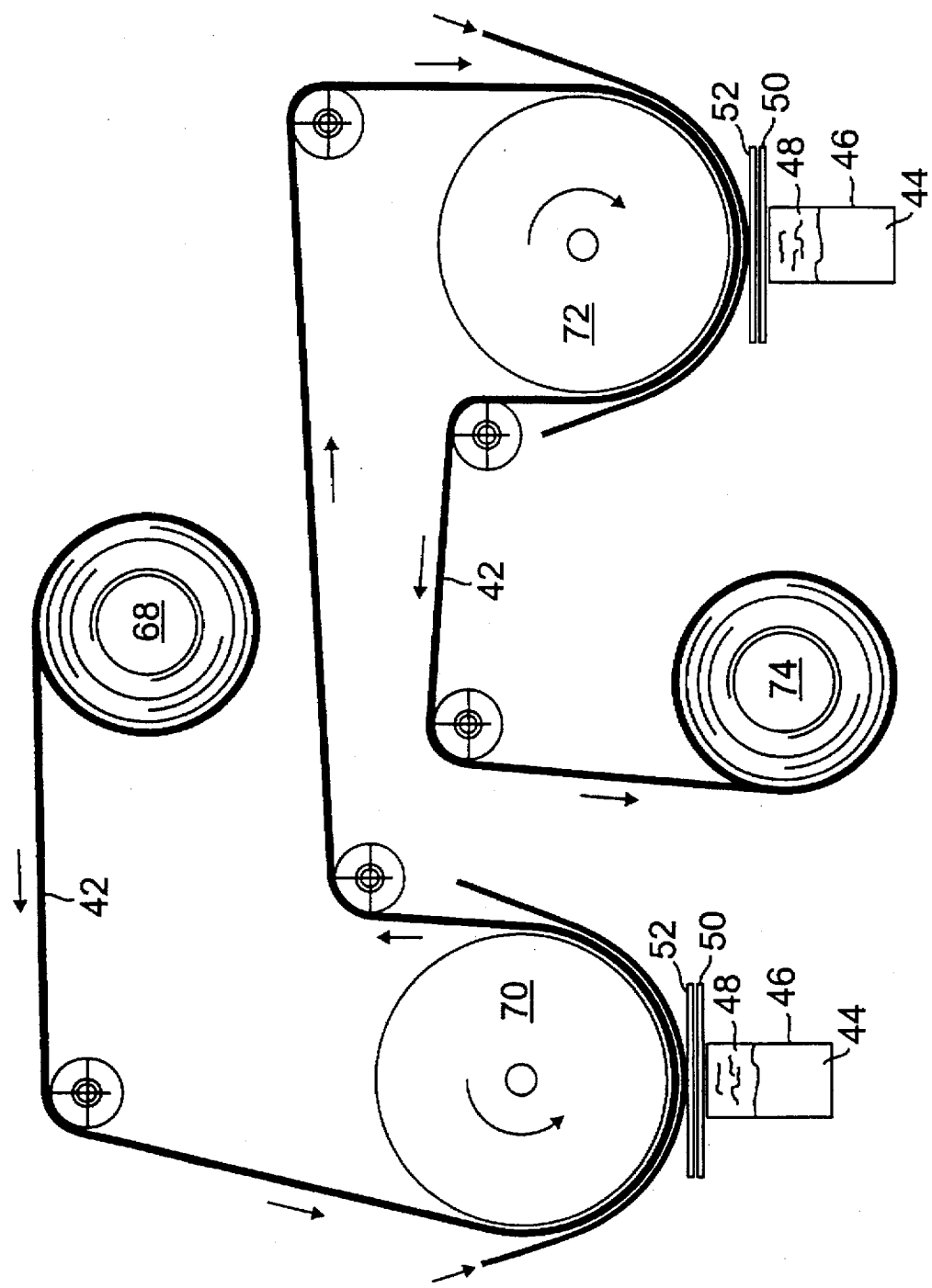
FIG. 28 is a drawing of yet another apparatus for vacuum-depositing electrodes on films in accordance with the invention.

With reference to FIG. 28, an apparatus is shown for vacuum-depositing electrode material on both sides of a film 42 in accordance with the invention. The film rolls off of roller 68 and passes under cooling drum 70, where one side of film 42 is metallized in the manner described above in connection with FIG. 21, and then film 42 passes under cooling drum 72, where the other side of film 42 is metallized. The metallized film is then wound around roller 74. After the metallization process is complete, the metallized film is slit longitudinally as described above. The electrode material on one side of each slit piece of the film is intended for contact with one of the end-sprays of a capacitor while the electrode material on the other side of the film is intended for contact with the other end-spray. In the process of forming the capacitor the metallized film is wound into a roll together with an unmetallized film that is not quite as wide as the metallized film, such that the electrode material on one side of the metallized film extends beyond the top of the unmetallized film and the electrode material on the other side of the metallized film extends beyond the bottom of the unmetallized film.

There have been described novel and improved apparatuses and techniques for electrode patterning in metallized electrode capacitors. It is evident that those skilled in the art may now make numerous uses and modifications of and departures from the specific embodiment described herein without departing from the inventive concept.

We claim:

1. A metallized capacitor comprising:

two layers of electrically insulating film wound as a roll;

two metal electrodes vacuum deposited on respective ones of the two layers of film; and two end-sprays of electrically conductive material deposited on respective ends of the roll, each of the end-sprays being in electrical contact with one of the two vacuum-deposited metal electrodes;

each of the metal electrodes comprising a segmented metallization pattern having segments of relatively thick electrode material separated by periodic segments of relatively thin electrode material so as to define a repeating pattern of relatively thick and relatively thin segments along the length of the layer of electrically insulating film on which the metal electrode is deposited.

2. A metallized capacitor in accordance with claim 1, wherein each of the metal electrodes has a thickness, at at least certain locations along the length of the film on which the electrode is deposited, that decreases from the end-spray with which the metal electrode is in contact to an edge of the film that is opposite to the end-spray, the thickness having a profile from the end-spray to the edge opposite the end-spray that provides approximately constant wattage from a point in the vicinity of the end-spray to a point in the vicinity of the edge opposite the end-spray during use of the capacitor.

3. A metallized capacitor in accordance with claim 2, wherein the thickness profile of each of the metal electrodes, at least at certain locations along the length of the film on which the electrode is deposited, varies approximately as the square of the distance from a point in the vicinity of the edge opposite the end-spray to a point in the vicinity of the end-spray.

4. A metallized capacitor in accordance with claim 1, wherein each of the metal electrodes is interrupted by a plurality of non-metallized gaps that extend at least a substantial portion of the way from the end-spray with which the metal electrode is in contact to an edge of the film that is opposite to the end-spray, the non-metallized gaps being arranged in a repeating pattern along the length of the layer of electrically insulating film on which the metal electrode is deposited.

5. A metallized capacitor in accordance with claim 1, wherein there is an abrupt transition between the segments of relatively thick electrode material and the segments of relatively thin electrode material.

6. A metallized capacitor in accordance with claim 1, wherein there is a gradual transition between the segments of relatively thick electrode material and the segments of relatively thin electrode material.

7. A metallized capacitor in accordance with claim 1, wherein each of the metal electrodes comprises a continuous edge of metal adjacent to the end spray with which the metal electrode is in contact having a thickness substantially greater than the rest of the metal electrode.

8. A metallized capacitor in accordance with claim 1, wherein each of the layers of electrically insulating film comprises a metal-free margin area at the edge of the film that is opposite to the end spray with which the metal electrode deposited on the film is in contact.

9. A metallized capacitor comprising:
   two layers of electrically insulating film wound as a roll;
   two metal electrodes vacuum deposited on respective ones of the two layers of film; and
   two end-sprays of electrically conductive material deposited on respective ends of the roll, each of the end-sprays being in electrical contact with one of the two vacuum-deposited metal electrodes;
   each of the metal electrodes having a thickness, at least at certain locations along the length of the film on which the electrode is deposited, that decreases from the end-spray with which the metal electrode is in contact to an edge of the film that is opposite to the end-spray, the thickness having a profile from the end-spray to the edge opposite the end-spray that provides approximately constant wattage from a point in the vicinity of the end-spray to a point in the vicinity of the edge opposite the end-spray during use of the capacitor.

10. A metallized capacitor in accordance with claim 9, wherein the thickness profile of each of the metal electrodes, at at least certain locations along the length of the film on which the electrode is deposited, varies approximately as the square of the distance from a point in the vicinity of the edge opposite the end-spray to a point in the vicinity of the end-spray.

11. A metallized capacitor in accordance with claim 9, wherein each of the metal electrodes comprises a continuous edge of metal adjacent to the end spray with which the metal electrode is in contact having a thickness substantially greater than the rest of the metal electrode.

12. A metallized capacitor in accordance with claim 9, wherein each of the layers of electrically insulating film comprises a metal-free margin area at the edge of the film that is opposite to the end spray with which the metal electrode deposited on the film is in contact.

* * * * *